(12) United States Patent
Hetzenecker et al.

(10) Patent No.: US 7,817,056 B2
(45) Date of Patent: Oct. 19, 2010

(54) DEVICE AND METHOD FOR DIFFERENTIATING BETWEEN A PERSON AND AN OBJECT ON A MOTOR VEHICLE SEAT USING MULTIPLE SENSORS

(75) Inventors: Erwin Hetzenecker, Regenstauf (DE); Peter Karges, Yokohama (JP); Reinhard Schmid, Zeitlarn (DE); Gerd Winkler, Regensburg (DE)

(73) Assignee: Siemens VDO Automotive AG, Munich (DE)

( * ) Notice: Subject to any disclaimer, the term of this patent is extended or adjusted under 35 U.S.C. 154(b) by 467 days.

(21) Appl. No.: 11/910,277

(22) PCT Filed: Mar. 28, 2006

(86) PCT No.: PCT/EP2006/061103

§ 371 (c)(1),
(2), (4) Date: Oct. 1, 2007

(87) PCT Pub. No.: WO2006/103237

PCT Pub. Date: Oct. 5, 2006

(65) Prior Publication Data

US 2008/0191856 A1    Aug. 14, 2008

(30) Foreign Application Priority Data

Mar. 30, 2005   (DE) ...................... 10 2005 014 526

(51) Int. Cl.
*G08B 21/00* (2006.01)

(52) U.S. Cl. .................. 340/667; 701/45; 180/272; 280/735

(58) Field of Classification Search ............ 340/667; 701/45; 180/273; 280/735
See application file for complete search history.

(56) References Cited

U.S. PATENT DOCUMENTS

| 7,216,895 B2 * | 5/2007 | Hattori et al. ............... 280/735 |
| 2004/0080425 A1 * | 4/2004 | Sullivan et al. ............. 340/667 |
| 2008/0204263 A1 * | 8/2008 | Krempl et al. .............. 340/667 |

FOREIGN PATENT DOCUMENTS

| DE | 196 25 730 A1 | 1/1998 |
| DE | 101 43 326 A1 | 3/2003 |
| DE | 698 12 448 T2 | 12/2003 |
| EP | 0 856 307 A2 | 8/1998 |

* cited by examiner

*Primary Examiner*—Jeffery Hofsass
(74) *Attorney, Agent, or Firm*—Laurence A. Greenberg; Werner H. Stemer; Ralph E. Locher

(57) ABSTRACT

A device and a method for differentiating between a person sitting on the seat surface of a vehicle seat and an object such as, for example, a child seat. The device has a cushion provided with weight sensors which are distributed over the seat surface in a plane manner, first weight sensors being arranged in a central region and second weight sensors being arranged on the edge of the seat surface. At least one central weight sensor is differentiated from a plurality of second weight sensors on the edge of the seat surface in that it always emits a comparatively low sensor signal when subjected to the same weight load.

16 Claims, 4 Drawing Sheets

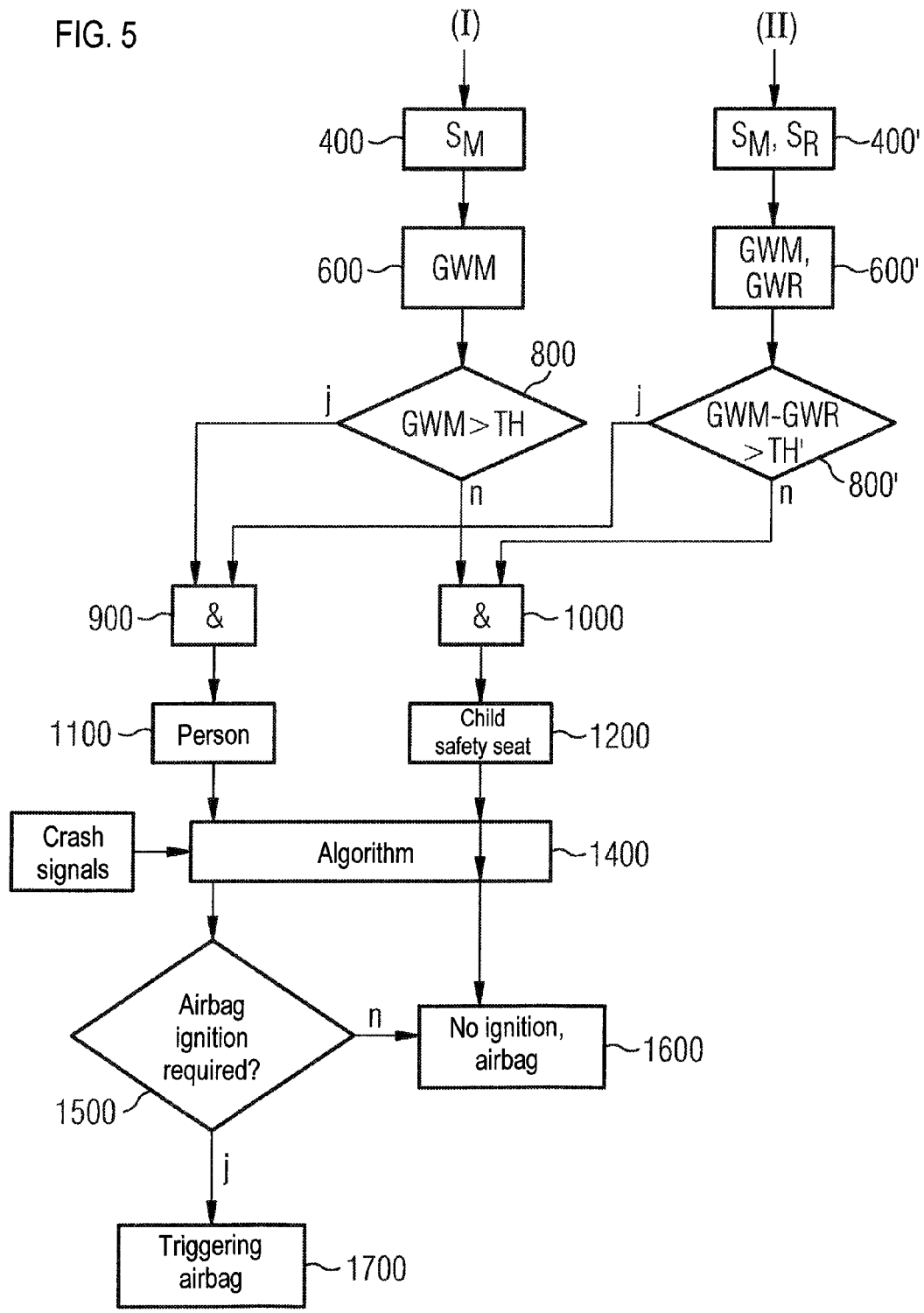

DEVICE AND METHOD FOR DIFFERENTIATING BETWEEN A PERSON AND AN OBJECT ON A MOTOR VEHICLE SEAT USING MULTIPLE SENSORS

BACKGROUND OF THE INVENTION

Field of the Invention

The invention relates to a device for differentiating between a person sitting on the seat surface of a motor vehicle seat and an object with at least a largely flat bearing surface which is arranged over a large part of the seat surface including a central region. The device comprises a motor vehicle seat, a seat mat provided with weight sensors which are disposed in a distributed fashion over the seat surface in a planar manner and an evaluation unit to which the signals of the weight sensors are supplied.

In the case of a multiplicity of technical applications in motor vehicles, an important input variable is the occupancy of a seat by the occupants in a motor vehicle. This in particular applies to restraint systems for the occupants in a motor vehicle, whose more efficient application of restraint facilities for the occupants in a motor vehicle, i.e. an application avoiding injury to persons, often depends on the position of the seat of the occupant in a motor vehicle.

In order to detect the occupancy of a seat in a motor vehicle, use is made of so-called sensor seat mats having a multiplicity of pressure-sensitive sensor elements as is known from the publication DE 200 14 200 U1. Said sensors are disposed in a distributed fashion over the seat surface of the motor vehicle seat and can thereby detect the force distributed by a person sitting on the motor vehicle seat or by an object placed on the seat surface. The sensor elements are resistor elements which change their resistance depending on the weight acting on them. These changes in the resistance can be measured as weight-dependent sensor signals at the resistor elements.

For this reason, a seat profile can be created by evaluating the sensor signals in an evaluation unit, on the basis of which it is possible to return to the position of the seat of the occupant in a motor vehicle, but also of objects which were placed on a seat surface of a motor vehicle. As a function of the determined occupancy of a seat, the triggering behavior of restraint means for the occupants in a motor vehicle, for example an airbag, is changed if necessary by the control unit of the protection system for the occupants in a motor vehicle so that an optimum protection for the occupant in a motor vehicle is ensured depending on the current position of the seat. In this process, it can perhaps be necessary to completely suppress the triggering of restraint means for the occupants in a motor vehicle such as, for example, that of an airbag, if, for example, an occupant in a motor vehicle is positioned too close to the restraint means for the occupants in a motor vehicle (airbag) to be triggered.

It is often of utmost importance when detecting the occupancy of a seat for the protection systems for the occupants in a motor vehicle to differentiate between items and objects. For example, in the event of a motor vehicle accident, the triggering of restraint means for the occupants in a motor vehicle (airbags) assigned to a relevant motor vehicle seat must then generally be suppressed, if a child safety seat, in particular a child safety seat disposed counter to the direction of travel with its backrest in the direction of the dashboard is detected by the system for detecting the occupancy of a seat. Systems for detecting the occupancy of a seat placed on a motor vehicle seat, which use only the sensor signals of a sensor seat mat, can often only differentiate poorly between for example a child safety seat and a very light person, for example, a so-called 5% woman, i.e. a woman who is assumed to be lighter and smaller than 95% of a representative group of women. However, especially in the case of a child safety seat disposed with its backrest in the direction of the dashboard, the triggering of above all an airbag should be suppressed, since this could injure a child in the child safety seat; however, in the case of a 5% woman the airbag should be triggered under normal conditions.

Therefore, for the safe detection of an object placed on a motor vehicle seat, in particular a child safety seat, costly additional detection systems are often used. From the publication DE 2 96 19 668 U1 it has for example become known that a transponder is arranged in a child safety seat and one transmitting antenna and one receiving antenna each are disposed in the motor vehicle seat on which the child safety seat was installed. By means of communication between the transmitting and receiving antennas in a motor vehicle seat and the transponders in the child safety seat, the child safety seat can be detected clearly.

However, such an additional detection system for detecting an object placed on a motor vehicle seat, in particular a child safety seat, makes a protection system for the occupants technically more expensive, whereby higher costs for a protection system for the occupants in a motor vehicle usually arise and the probability of failure is perhaps increased.

In a particularly suitable way, a person sitting on a motor vehicle seat can be differentiated from an object placed thereon, which—as is the case with most child safety seats—at least has a partially flat bearing surface, if the seat surface of the motor vehicle seat is curved in a concave manner in the direction of the bottom of the motor vehicle. In this process, the detection takes place with the aid of a sensor seat mat, which extends over both the central seat surface that is curved in a concave manner in the direction of the bottom of the motor vehicle and over and into a region around this concave curvature. In this process the fact is utilized that the weight of an occupant in a motor vehicle in the case of a normal sitting posture is, for anatomical reasons, distributed in a completely different manner over the seat surface than the weight of an object with a largely flat bearing surface: an occupant in a motor vehicle usually applies the largest part of his weight in a central region of the seat surface by means of his buttocks on the motor vehicle seat; whereas an object with a largely flat bearing surface can, on the other hand, distribute its weight evenly over the flat bearing surface on the seat surface. This weight distribution can be detected by the sensors of the seat mat and in this way serve to differentiate between a person sitting on and an object placed on the seat.

However, many motor vehicle seats in a central region of their seat surface are not curved in a concave manner in the direction of the bottom of the motor vehicle so that this method is not applicable to differentiate between a person sitting on the motor vehicle seat and an object with a flat underbody. Many seat surfaces are for example very flat or even curved in a convex manner, and therefore unsuitable in principle to use the described measuring method.

SUMMARY OF THE INVENTION

The object underlying the present invention is thus to provide a simple alternative device and a simple alternative method to differentiate between a person sitting on the seat surface of a motor vehicle seat and an object with at least a largely flat bearing surface, in particular a child safety seat.

This object is achieved by means of a device in accordance with claim 1. Said device serves to differentiate between a person sitting on the seat surface of a motor vehicle seat or an object placed on the seat surface of a motor vehicle seat, in particular a child safety seat, with at least a largely flat bearing surface, which is arranged over a large part of the seat surface including a central region. Said device comprises a seat mat provided with weight sensors which are distributed over the seat surface in a planar manner, first weight sensors being arranged in a central region and second weight sensors being arranged within the region of the seat surface covered by the object outside the central region. In accordance with the invention, at least one first weight sensor is differentiated from a plurality of second weight sensors within a weight region to be detected by the device in that it always emits a sensor signal that is lower by more than the measuring inaccuracy of the device when subjected to the same weight load.

In this process, the weight region to be detected by the device is preferably a partial region of the weight-dependent characteristic of the sensor values of at least one weight sensor with a preferred large, approximated linear upward gradient.

At least one weight sensor but preferably a plurality of weight sensors which are distributed in a central region over the seat surface in a planar manner, emit a lower signal in the case of a supported object with a flat underbody than that of sensors being arranged on the edge of said seat surface. The measuring principle that is made possible in the case of seat surfaces curved in a concave manner in the direction of the bottom of the motor vehicle, as described in the introduction, is to a certain extent emulated in this way on the basis of the characteristics of the sensors.

In this process, the measurable signal differentiation between the different weight sensors distributed in such a way in a central region over the seat surface in a planar manner and the weight sensors being arranged on the edge of said seat surface must however be greater than the measuring inaccuracy which stems from the measuring electronics. Otherwise the different sensor signals would only be coincidental and the measured signal differentiation could not serve for a reliable differentiation between an object placed on the motor vehicle seat and a person sitting on the motor vehicle seat.

By way of a simple comparison of the signal of the first weight sensor or the signals of a plurality of first weight sensors to the signal of a plurality of second weight sensors, a very safe differentiation between an object with at least a partially flat underbody, in particular a child safety seat, and a person can be made possible in this way.

A safe person-object differentiation, in particular a person-child safety seat differentiation, can then for example be given if the first weight sensor or a plurality of first weight sensors when subjected to the same weight load emit less than 50% of the signal amplitude of at least one of a plurality of second weight sensors: this signal differentiation generally constitutes far more than the usual measuring tolerances in the case of such a sensor device.

Typically however already a signal amplitude that is lower around the region of 30% or—with very exact measuring instruments—often even a signal amplitude that is only lower by 5% is sufficient as the signal amplitude of at least one of a plurality of second weight sensors.

If a part of the seat surface is covered by the object and is in addition curved in a concave manner in the direction of the bottom of the motor vehicle, then the weight of the object is not distributed evenly over the seat surface, but only on the places of the seat surface around the concave curvature. If the first weight sensor or the first weight sensors are arranged within the partial region of the seat surface that is curved in a concave manner and being arranged in a central region, said sensor or sensors are thus, in addition, subjected to very much less weight than such second weight sensors which are arranged outside this region of the seat surface that is curved in a concave manner and being arranged in a central region, which are no doubt covered equally by the object, however coming into direct contact with the largely flat bearing surface of the object. Thus the sensor signal or the sensor signals are in addition reduced. Conversely, the first weight sensor or the first weight sensors are directly subjected to more weight than the second weight sensors outside the region of the seat surface that is curved in a concave manner and being arranged in a central region of the seat surface. This can in addition substantially facilitate the person-object differentiation.

In accordance with the invention for a safe detection of a described object, in particular a child safety seat, it is in addition advantageous that the curvature of the seat surface of the motor vehicle seat is embodied in such a way that less than 50%, preferably less than 30% or even less than 5% of the weight load by the object acts on the first weight sensor or on the first weight sensors, than on at least a second weight sensor, which is covered completely by the object.

In this process, it is particularly advantageous if the first weight sensor or the first weight sensors do not experience a weight load by such an object. The differentiation between the signals of the loaded second weight sensors and the signals of one weight sensor or a plurality of unloaded first weight sensors is then particularly simple.

The object is in addition achieved by means of a method in accordance with claim 6.

The object is in addition achieved by means of a method in accordance with claim 6 to differentiate between a person sitting on the seat surface of a motor vehicle seat and an object with at least a largely flat bearing surface, which is arranged over a large part of the seat surface including a central region, the method making use of a device with a seat mat provided with weight sensors which are distributed over the seat surface of the motor vehicle in a planar manner and an evaluation unit to which the signals of the weight sensors are supplied. In addition, the following procedural steps are executed in the case of the procedure in accordance with the invention:

Detecting the signal of at least one first weight sensor, which is arranged in the central region of the seat surface, Detecting the signals of a plurality of second weight sensors, which are arranged outside the central region in the region of the seat surface covered by the object, Comparing the signal of the first weight sensor to signals of the second weight sensors, Detecting the object as soon as the signal of the first weight sensor is less than 50%, preferably less than 30%, in particular less than 5% of at least one signal of a second weight sensor.

The comparison of the signals of the weight sensors can for example be carried out as the comparison of a first weight sensor with an average value of the signals of the second weight sensors. Instead, in the case of a plurality of first weight sensors, an average value of the signals of the first weight sensors can also be used for the comparison. However, the signals of the first weight sensor and the second weight sensors can also be compared individually among each other in each case and, if necessary, also combined with a comparison of average values. Detecting the object takes place on the basis of the result from this comparison or these comparisons of the signals of the weight sensors.

Further advantageous embodiments of the method in accordance with the invention are given in claims 7 to 9.

Even if the operational area of the method in accordance with the invention is not only restricted to the range of automotive technology, this safe and simple procedure is however particularly favorable to be used in protection systems for the occupants in a motor vehicle, in the case of which when detecting an object with a largely flat bearing surface, the activation of restraint means for the occupants in a motor vehicle should always be suppressed, preferably, if a child safety seat is detected as the object. However, it is also feasible that other detected objects should lead to the deactivation of restraint means for the occupants in a motor vehicle: for example, the method could also advantageously be used for the detection of large packages or the like, which likewise exhibit a largely flat bearing surface. The triggering of restraint means for the occupants in a motor vehicle would be unnecessary with such an object and would only incur high follow-up costs by repairs to the motor vehicle after triggering the restraint means for the occupants in a motor vehicle. Therefore, preference is given to not triggering the restraint means.

The invention is described in more detail below with reference to several drawings. They are as follows:

DESCRIPTION OF THE INVENTION

Figure 1:
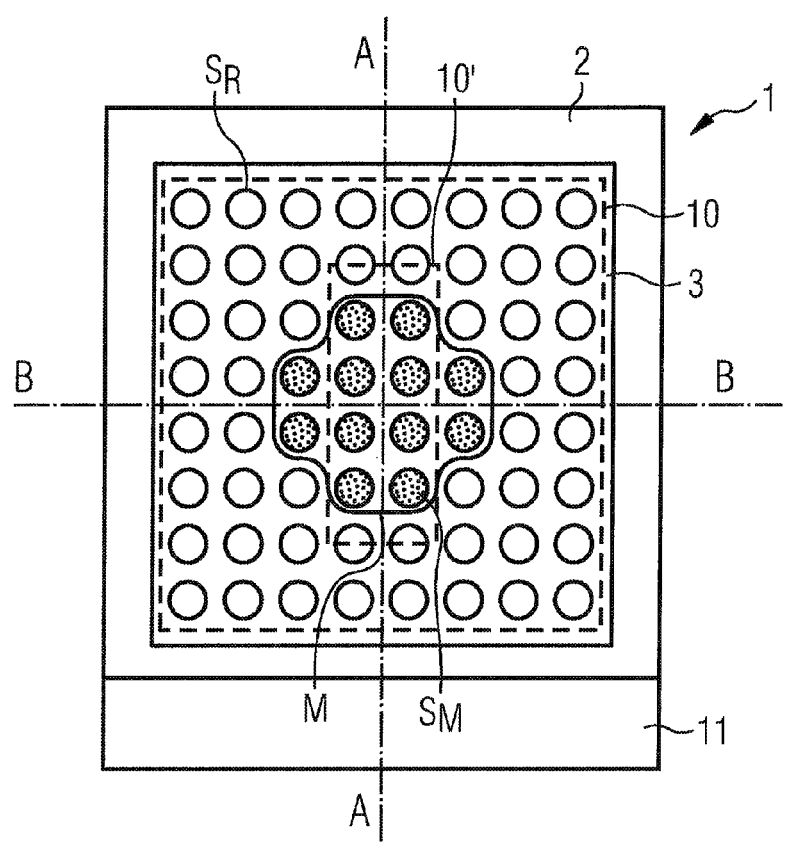
FIG. 1 top view of a device in accordance with the invention of a motor vehicle seat with a seat line and a seat surface, FIG. 2 cross-section of the motor vehicle seat from the figure with a child safety seat on its seat surface, FIG. 3 a motor vehicle seat as in the figure, but with a person sitting on the seat surface, FIG. 4 the schematic process of the weight-dependent characteristics of the weight sensors of a device in accordance with the invention and FIG. 5 an operational sequence in accordance with the invention.
Figure 1:
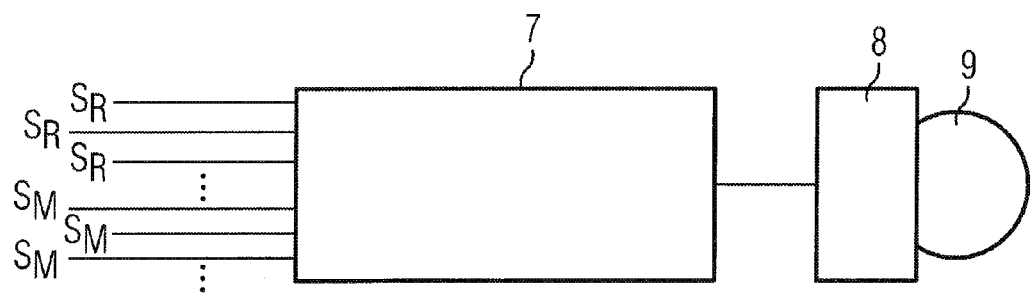

In accordance with the invention, FIG. 1 is a top view of an exemplary embodiment of a device with a motor vehicle seat 1 with a backrest 11 and a seat surface 2; a seat mat 3 is arranged thereupon, which has weight-sensitive sensors $S_R$, $S_M$, at which one sensor signal can each be measured by an evaluation unit 7, which gives information about the weight forces acting on the sensors $S_R$ and $S_M$. A bordered range provided with the reference symbol M represents a central region of the seat surface 2 in a planar manner in which weight sensors $S_M$ are distributed in a central region over the seat surface in a planar manner.

The evaluation unit 7 is connected to a triggering unit 8, which can cause the triggering of a protection system for the occupants in a motor vehicle 9, for example, a front airbag, if the signals of (not represented) impact sensors such as for example acceleration sensors or pressure sensors are characteristic of an impact accident.

A quadratic surface area 10 shown by means of a dashed line on the seat surface 2 represents the largely flat bearing surface of a child safety seat 4. Depending on the embodiment of the child safety seat 4, it is therefore not mandatory that the largely flat bearing surface occupies the entire closed surface 10. The flat surface 10 can be interrupted by a recess.

Figure 2:
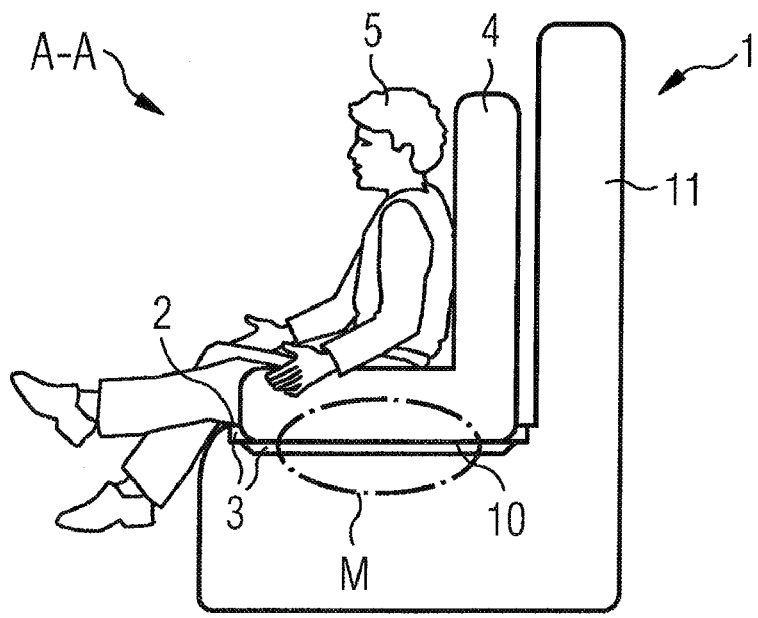

FIG. 2 is a cross-section of the motor vehicle seat 1 from FIG. 1 along the cross-section line A-A. The child safety seat 4 in which a child is sitting is placed on the seat surface 2. The weight of the child safety seat 4 with the child 5 sitting on it, distributes itself evenly over the largest part of the seat mat 3; also over the central region M of the seat surface in a planar manner. The weight sensors $S_M$ located there and the sensors $S_R$ being arranged on the edge of the seat surface in each case supply a weight-dependent signal that can be measured by the evaluation unit 7. However, the sensors $S_M$ in the central region M supply a comparatively lower signal than that of the weight sensors $S_R$ when subjected to comparatively the same weight than that of the weight sensors $S_R$ being arranged on the edge of the seat surface.

Figure 3:
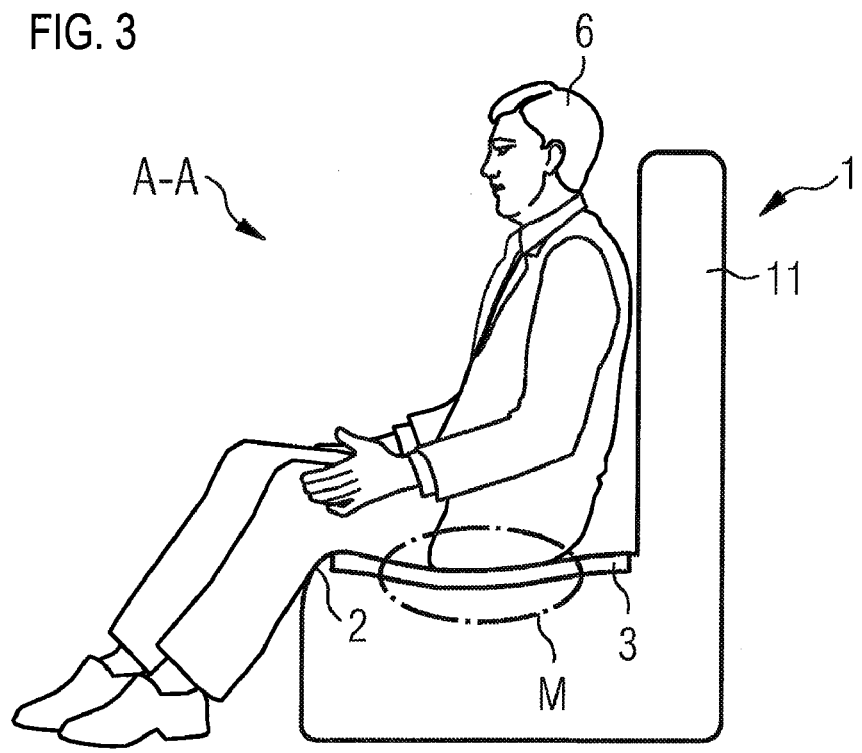

FIG. 3 shows a person 6 sitting on a motor vehicle seat. The buttocks of said person 6 apply a substantially greater load to the central region M of the seat surface 2 of the motor vehicle seat 1 than the parts of the seat surface 2 being arranged on the edge of the seat surface. Comparatively more weight is applied there to the seat surface 2 than to outside this central region M so that the central region M of the seat surface 2 of the motor vehicle seat 1 curves in a concave manner in the direction of the bottom of the motor vehicle. Usually the bottom of the interior of the motor vehicle takes up a further part of the weight of the person 6, since usually the legs of the person are placed there; moreover the backrest 11 also takes up weight since the person 6 usually leans against the backrest 11. Often the arm rests, the steering wheel etc. also take up a part of the weight of the occupant of a motor vehicle since said occupant prefers to put down his arms there or holds on, etc.

Figure 4:
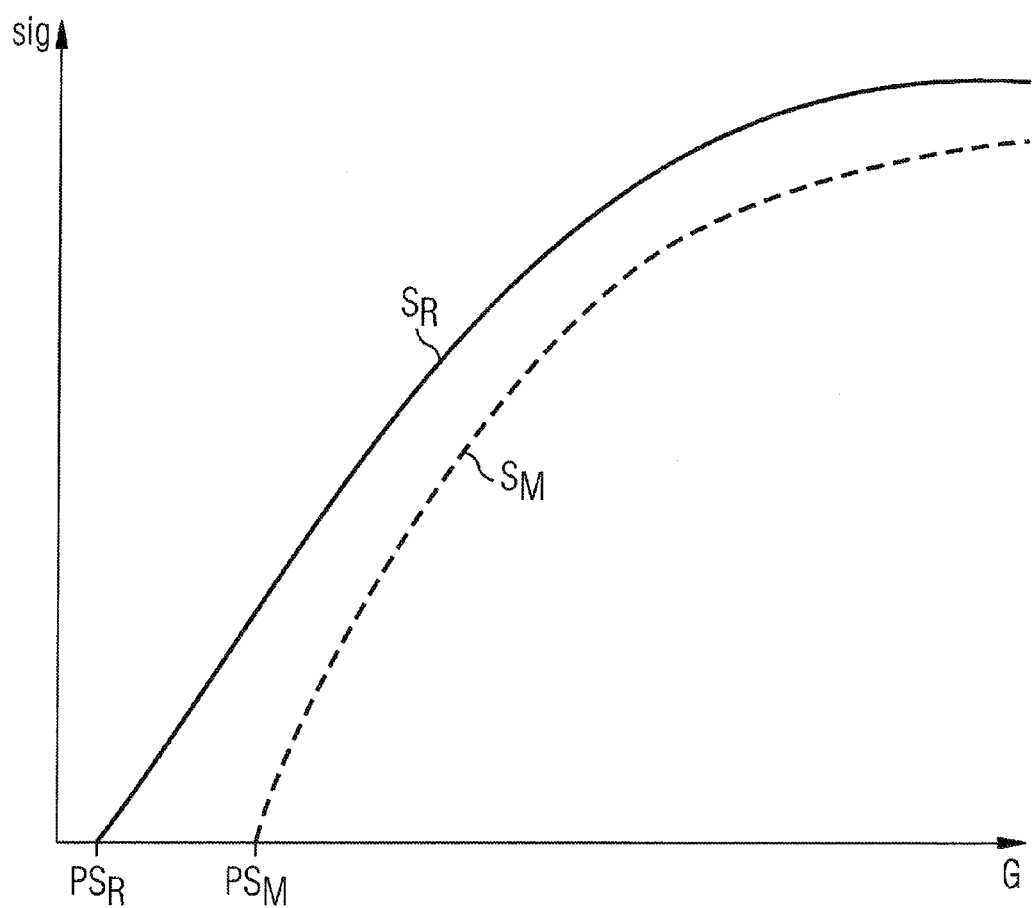

FIG. 4 in each case shows a characteristic of a sensor element $S_R$ being arranged on the edge of the seat surface and a sensor element $S_M$ being arranged in a central region on the basis of a schematic representation. The sensor signal sig is plotted along the abscissa. The ordinate shows the weight force G, which acts on the sensor cell.

The solid line $S_R$ represents the characteristic of a weight sensor $S_R$ being arranged on the edge of the seat surface: only after reaching a minimum weight force $PS_R$, which, is for example dependent on the size of the sensor cell of the weight sensor $S_R$, does the curve $S_R$ increase to higher weight forces E in a continuous and almost linear manner, until the sensor signal approaches a constant value. Afterwards an additional sensor signal cannot be produced even when further increasing the weight force G.

The dashed line $S_M$ shows schematically the characteristic of the sensor element $S_R$ being arranged in a central region: up to the reaching of a minimum signal $PS_M$, in the case of this sensor element a greater weight force G must be applied here than to the sensor element $S_R$ being arranged on the edge of the seat surface. Afterwards also this characteristic increases continuously with an increasing weight force G, until it likewise approaches a constant value. Even when further increasing the weight force G, the sensor signal sig of the weight sensor $S_M$ being arranged in the central region does not exceed this value. However, this maximum signal value of the weight sensor $S_M$ being arranged in the central region is comparatively lower here than that of the weight sensor $S_R$ being arranged on the edge of the seat surface.

However, in contrast to the curve $s_R$, the upward gradient of the characteristic $S_M$ is steeper. The signal of the weight sensor $S_M$ being arranged in the central region reacts substantially more sensitively to a change in the weight force G than that of the signal of the weight sensor $S_R$ being arranged on the edge. As a result of this, the triggering accuracy of the weight forces acting on the weight sensors drops.

A different characteristic of weight sensors can be produced in different ways and depends on the structure of the weight sensor. A typical weight sensor as is also for example often used in an object in accordance with the publication DE 214 200 U1 described in the introduction, consists of two conductive surfaces which are laminated onto two opposite foils. The two foils are kept at a distance from each other by means of so-called spacers. By applying a force, the two conductive surfaces approach each other until they finally touch one another. If the force continues to increase, then the contact surface also becomes larger in this way. The resistance of the contact surface is determined by the two conductive surfaces making contact with one another.

Therefore, the resistance of a weight sensor structured in such a way depends on the weight force which acts on the two associated foils, A change in the characteristic of a weight sensor can thereby for example be brought about by a larger or smaller conductive surface or also by a change in the distance of the foils to each other in the resting state, which is however mere costly. This is explained in greater detail further below.

The almost linear region of a sensor characteristic is the preferred operating range of a weight sensor. The region of the weight, in which at least one sensor signal can continuously just still change so strongly being weight-dependent, that it can be used for a safe weight detection, is the usual maximum meaningful weight range to be detected by the device. However, depending on the desired signal triggering and depending on the desired weight range to be detected, this weight range can also be selected smaller. Should a larger weight range to be detected be required, then mostly the sensor geometry must be adapted accordingly, thus the sensor cells must for example be increased or made smaller as described above.

FIG. 5 shows an embodiment of a method in accordance with the invention.

In a first procedural section 1, the evaluation unit 7 detects in a procedural step 400, the signals of the first weight sensor $S_M$ distributed in a central region over the seat surface in a planar manner. From these sensor signals, in a procedural step 600, a weight value GWM is derived that is characteristic of the weight load on the region M distributed in a central region over the seat surface 2 in a planar manner. For example, an, if necessary additionally more weighted, average value of the sensor signals of the weight sensor $S_M$ distributed in a central region over the seat surface in a planar manner can be formed. The gained value GWM is compared in a further procedural step 800 to a threshold value TH.

In a second procedural section II, which takes place at the same time or time-shifted to the first procedural section I, in a procedural step 400', the sensor signals of the second weight sensor $S_R$ outside the region M being arranged in a central region of the seat surface 2 and the sensor signals of the first weight sensors are determined if this has not already happened in a procedural step 400.

In a next procedural step 600', if this has not already happened in a procedural step 600, a value GWM is derived from the signals of the first weight sensors, which is characteristic of the weight load distributed over the central region of the seat surface in a planar manner. Likewise, an appropriate value GWR is determined from the signals of the second weight sensor $S_R$, which is characteristic of the weight load outside the region M being arranged in a central region of the seat surface 2.

In a next procedural step 800, the difference between the two values GWM and GWR is compared to a threshold value TH'. If this difference exceeds the threshold value TH', for example by 5%, 30%, 50% or even more, then this is a reference to the fact that a person 6 could be sitting on a seat surface 2 and not an object. If the value GWM in addition exceeds the threshold value TH, then this is a further reference to a person 6 sitting on a motor vehicle seat. In a procedural step 900, these two references are logically linked to one another and as result, in a further procedural step 1100, the presence of a person 6 sitting on the seat surface 2 is detected.

However, if the difference between the two values GWM and GWR falls below the threshold value TH', then it is to be accepted that a child safety seat 4 has for example been placed on the seat surface 2. If the value GWM at the same time falls below the threshold value TH, then this is to be regarded as the further reference to it. In a procedural step 1000, these pieces of information are therefore logically linked to one another and the presence of a child safety seat 4 on the seat surface 2 is determined in a further procedural step 1200.

The information as to whether or not a person 6 is sitting on the seat surface 2 of a motor vehicle seat or a child safety seat 4 is placed on the seat surface 2 of a motor vehicle seat is supplied to the evaluation unit 7 for evaluation by a stored special algorithm. This is represented in FIG. 5 by the procedural step 1400. The crash signals of suitable crash sensors are supplied, in addition, to the algorithm of the evaluation unit, which can be evaluated by the algorithm. On the basis of this evaluation, information is present in the evaluation unit as to whether or not there is an accident situation.

Therefore, the algorithm makes the decision in a further procedural step 1500 whether or not the ignition of, for example, an airbag is required. If no ignition of an airbag is required due to the crash signals, then the evaluation unit 17 in a further procedural step 1600 decides that no ignition of the airbag takes place.

If a child safety seat 4 was detected on the seat surface 2, then an airbag is on no account triggered, not even if crash signals point to a motor vehicle accident. This is indicated in FIG. 5 by means of the arrow, which is led away via the block that represents the procedural step 1400 for the algorithm.

However, if the ignition of an airbag is necessary and if a person sitting on the motor vehicle seat was detected at the same time, then the evaluation unit 7 in a further procedural step 1700 decides that an airbag is to be triggered.

The invention claimed is:

1. A device for distinguishing whether a person is seated on a seat surface of a motor vehicle seat or an object is disposed thereon, the object having a substantially planar contact surface covering a large part of said seat surface, including a central area thereof, the device comprising:
   a seat mat carrying a plurality of weight sensors distributed over the seat surface of the motor vehicle seat, said weight sensors including first weight sensors disposed in a central area of the seat surface and second weight sensors disposed in a region of the seat surface covered by the object and outside the central area;
   at least one of said first weight sensors being different from a plurality of said second weight sensors within a weight range to be detected by the device such that said at least one first weight sensor always emits a sensor signal that is lower by more than a rated measuring inaccuracy of the device when subjected to an equal weight load.

2. The device according to claim 1, wherein said at least one first weight sensor, when subjected to the same weight load, emits a sensor signal that is lower by 50% than at least one of said plurality of second weight sensors.

3. The device according to claim 1, wherein said at least one first weight sensor, when subjected to the same weight load, emits a sensor signal that is lower by 30% than at least one of said plurality of second weight sensors.

4. The device according to claim 1, wherein said at least one first weight sensor, when subjected to the same weight load, emits a sensor signal that is lower by 5% than at least one of said plurality of second weight sensors.

5. The device according to claim 1, wherein said at least one first weight sensor is one of a plurality of first weight sensors having substantially identical features.

6. The device according to claim 1, wherein the object is a child seat.

7. The device according to claim 1, which further comprises an evaluation unit disposed to receive signals issued by said first and second weight sensors.

8. A method for distinguishing whether a person is seated on a seat surface of a vehicle seat or an object with a substantially flat bearing surface extending over a large part of the seat surface, including a central area thereof, is disposed on the seat surface, the method which comprises:
   providing a device with a seat mat having a plurality of weight sensors distributed over the seat surface of the vehicle seat, and an evaluation unit connected to receive signals of the weight sensors;
   detecting a first signal of at least one first weight sensor disposed in a central area of the seat surface;
   detecting second signals of a plurality of second weight sensors disposed outside the central area, in a region of the seat surface covered by the object;
   comparing the first signal of the first weight sensor with the second signals of the second weight sensors; and
   determining that the object is present when the first signal of the first weight sensor is less than 50% of at least one second signal of a second weight sensor.

9. The method according to claim 8, which comprises determining that the object is present when the first signal of the first weight sensor is less than 30% of at least one second signal of a second weight sensor.

10. The method according to claim 8, which comprises determining that the object is present when the first signal of the first weight sensor is less than 5% of at least one second signal of a second weight sensor.

11. The method according to claim 8, which comprises the following steps:
   detecting the signals of a plurality of first weight sensors;
   detecting the signals of a plurality of second weight sensors, wherein the second weight sensors are disposed outside the central area in a region of the seat surface covered by the object;
   comparing the signals of the first weight sensors with the signals of the second weight sensors;
   detecting the object as soon as the signal of at least one first weight sensor is less than 50% of at least one signal of a second weight sensor.

12. The method according to claim 11, which comprises detecting the object as soon as the signal of at least one first weight sensor is less than 30% of at least one signal of a second weight sensor.

13. The method according to claim 11, which comprises detecting the object as soon as the signal of at least one first weight sensor is less than 5% of at least one signal of a second weight sensor.

14. The method according to claim 11, which comprises detecting the object as soon as the signals of the first weight sensors are less than 50% of the signals of the second weight sensors.

15. The method according to claim 8, which comprises, upon determining that the object is present, entering a setting that an activation of restraint means for occupants in a motor vehicle should always be suppressed.

16. A method for distinguishing whether a person is seated on a seat surface of a vehicle seat or an object with a substantially flat bearing surface extending over a large part of the seat surface, including a central area thereof, is disposed on the seat surface, the method which comprises:
   providing a device with a seat mat having a plurality of weight sensors distributed over the seat surface of the vehicle seat, the weight sensors including first weight sensors disposed in a central area of the seat surface and second weight sensors disposed in a region of the seat surface covered by the object and outside the central area, and at least one of the first weight sensors being different from a plurality of the second weight sensors within a weight range to be detected by the device such that the at least one first weight sensor always emits a sensor signal that is lower by more than a rated measuring inaccuracy of the device when subjected to an equal weight load;
   providing an evaluation unit connected to receive signals of the weight sensors;
   detecting a first signal of at least one first weight sensor disposed in the central area of the seat surface;
   detecting second signals of a plurality of second weight sensors disposed outside the central area, in the region of the seat surface covered by the object;
   comparing the first signal of the first weight sensor with the second signals of the second weight sensors; and
   determining that the object is present when the first signal of the first weight sensor is less than 50% of at least one second signal of a second weight sensor.

* * * * *